US005618862A

United States Patent [19]
Germanaud et al.

[11] Patent Number: 5,618,862
[45] Date of Patent: Apr. 8, 1997

[54] PREPARATION OF BITUMEN/POLYMER COMPOSITIONS AND USE THEREOF

[75] Inventors: Laurent Germanaud, Heyrieux; Jean Pascal Planche, Gravetan-St Just Chaleyssin; Patrick Turello, Francheville, all of France

[73] Assignee: Elf Antar France, Courbevoie, France

[21] Appl. No.: 564,351

[22] PCT Filed: Apr. 14, 1995

[86] PCT No.: PCT/FR95/00497

§ 371 Date: Mar. 11, 1996

§ 102(e) Date: Mar. 11, 1996

[87] PCT Pub. No.: WO95/28446

PCT Pub. Date: Oct. 26, 1995

[30] Foreign Application Priority Data

Apr. 18, 1994 [FR] France ................................. 94 04577

[51] Int. Cl.$^6$ ................................................. C08L 95/00
[52] U.S. Cl. ................................. 524/68; 524/59; 524/69; 524/70; 524/71
[58] Field of Search .................................. 524/59, 68, 69, 524/70, 71

[56] References Cited

U.S. PATENT DOCUMENTS

| 4,145,322 | 3/1979 | Maldonado et al. | 524/68 |
| 4,554,313 | 11/1985 | Hagenbach et al. | 524/68 |
| 4,567,222 | 1/1986 | Hagenbach et al. | 524/476 |
| 5,070,123 | 12/1991 | Moran | 524/69 |
| 5,095,055 | 3/1992 | Moran | 524/59 |
| 5,508,112 | 4/1996 | Planche et al. | 524/68 |

*Primary Examiner*—Peter A. Szekely
*Attorney, Agent, or Firm*—Burgess, Ryan and Wayne

[57] ABSTRACT

Bitumen/polymer compositions with a broadened plasticity range are produced by stirring together a bitumen or bitumen mixture and a sulphur-cross-linkable elastomer as well as a sulphur-donating coupling agent at 100°–230° C. to give a cross-lined bitumen/polymer composition, stirring an acid or acid anhydride inorganic admixture into the composition at 100°–230° C., and maintaining the resulting reaction medium at 100°–230° C. while stirring for at least 20 minutes. Such bitumen/polymer compositions may be used directly or in dilute form to provide bituminous binders for road surfaces, coated materials and sealing coatings.

29 Claims, No Drawings

PREPARATION OF BITUMEN/POLYMER COMPOSITIONS AND USE THEREOF

BACKGROUND OF THE INVENTION

1) Field of the Invention

The invention relates to a process for the preparation of bitumen/polymer compositions with a reinforced multigrade character. It also relates to the application of the compositions obtained to the production of bitumen/polymer binders for surfacings and especially for road surfacings or for leakproof facings.

2) Background Art

Bitumen/polymer compositions with a reinforced multigrade character are intended, according to the invention, to mean bitumen/polymer compositions which have a wide plasticity range. The said range is defined as the difference between the ring-and-ball softening temperature (abbreviated to RBT), which reveals the properties of the binder or bitumen/polymer composition when heated, and the Fraass brittle point, which reveals the properties of the bitumen/polymer composition when cold. The wider the plasticity range, the better will the bituminous binder consisting of, or based on, the bitumen/polymer composition resist stresses when heated and when cold.

The abovementioned values of the ring-and-ball softening temperature (RBT) and Fraass brittle point are determined by standardized procedures as shown below:

ring-and-ball softening temperature: determined according to NF standard T 66 008 and expressed in °C.;

Fraass brittle point: determined according to NF standard T 66 026 and expressed in °C.

Crosslinking, using sulphur, of elastomers bearing unsaturations, especially copolymers of styrene and of a conjugated diene such as butadiene or isoprene, within bitumens produces bitumen/polymer compositions which have an improved stability and excellent physicomechanical characteristics, and which can be employed for the production of various dressings, especially road surface dressings, bituminous mixes or else leakproof facings exhibiting improved characteristics when compared with the dressings obtained from bitumens alone.

The preparation of bitumen/polymer compositions of the abovementioned type, in which the sulphur-cross-linkable elastomer is a copolymer of styrene and of a conjugated diene, is described, in particular, in references FR-A-2376188, FR-A-2528439 and EP-A-0360656.

It is also known that the properties of bituminous compositions consisting of mixtures of bitumens and of block copolymers of styrene and of a conjugated diene, especially block copolymers of styrene and of butadiene, can be improved by incorporating into said compositions a small quantity of a nonoxidizing. inorganic acid such as phosphoric acid (DE-A-2255173). The results obtained can be improved if the acid is added to the bitumen before the block copolymer is incorporated into it (U.S Pat. No. 5070123).

SUMMARY OF THE INVENTION

It has now been found that it is possible to widen the plasticity range of sulphur-crosslinked bitumen/polymer compositions by incorporating into these compositions, after the sulphur crosslinking stage, an inorganic adjuvant of the acid or acid anhydride type.

This result is of an unexpected nature in the light of the observations, made by the Applicant Company, that sulphur crosslinking of mixtures of a bitumen and of a block copolymer of styrene and of a conjugated diene already containing the inorganic adjuvant of the acid or acid anhydride type, incorporated into the bitumen before the addition of the copolymer or else added to the mixture of the bitumen and of the copolymer, produces bitumen/polymer compositions which do not have the improved characteristics of the bitumen/polymer compositions obtained by the process forming the subject of the invention, that is to say consisting in incorporating the inorganic adjuvant into the bitumen/polymer composition which has just undergone the sulphur crosslinking.

The bitumen/polymer compositions obtained by the process according to the invention have a widened plasticity range, a higher breaking stress and an improved elastic modulus.

DESCRIPTION OF THE PREFERRED EMBODIMENTS

The process according to the invention for the preparation of bitumen/polymer compositions with a reinforced multigrade character, that is to say exhibiting, inter alia, a wider plasticity range, is of the type in which, while operating at temperatures of between 100° C. and 230° C. and with agitation for a period of at least 10 minutes, a bitumen or mixture of bitumens is brought into contact with, calculated by weight of bitumen or mixture of bitumens, 0.5% to 20% and preferably 0.7% to 15% of a sulphur-crosslinkable elastomer and a sulphur-donating coupling agent in a quantity such as to provide a quantity of free sulphur. representing 0.1% to 20% and preferably 0.5% to 10% of the weight of the sulphur-crosslinkable elastomer in the reaction mixture formed from the bitumen or mixture of bitumens, elastomer and coupling agent ingredients, in order to produce a sulphur-crosslinked composition, and is characterized in that into the reaction mixture resulting from the sulphur vulcanization, maintained at a temperature of between 100° C. and 230° C. and with agitation, there is incorporated 0.005% to 5% and preferably 0.01% to 2%, by weight of the bitumen, of an inorganic adjuvant consisting of at least one compound chosen from the group made up of phosphoric acids, boric acids, sulphuric acid, the anhydrides of the said acids and chlorosulphuric acid, and the reaction mixture containing the inorganic adjuvant is maintained at the temperature of between 100° C. and 230° C. and with agitation for a period of at least 20 minutes.

Among the abovementioned compounds which are capable, by themselves or as mixtures, of constituting the inorganic adjuvant which is incorporated into the reaction mixture resulting from the sulphur vulcanization of the mixture of bitumen or bitumens and of sulphur-crosslinkable elastomer, there may be mentioned the compounds chosen from $H_3PO_4$, $P_2O_5$, $H_3BO_3$, $B_2O_3$, $H_2SO_4$, $SO_3$ and $HSO_3Cl$.

The bitumen or mixture of bitumens which is employed in the process according to the invention is advantageously chosen from the various bitumens which have a kinematic viscosity at 100° C. of between $0.5 \times 10^{-4}$ m$^2$/s and $3 \times 10^{-2}$ m$^2$/s and preferably between $1 \times 10^{-4}$ m$^2$/s and $2 \times 10^{-2}$ m$^2$/s. These bitumens may be bitumens from direct distillation or from distillation at reduced pressure or else blown or semi-blown bitumens, or even some petroleum cuts or mixtures of bitumens and of vacuum distillates. Besides a kinematic viscosity included within the abovementioned ranges, the bitumen or mixture of bitumens employed for obtaining the compositions according to the invention advantageously has a penetrability, defined in accordance with NF Standard T 66004, of between 5 and 500 and preferably between 10 and 400.

The sulphur-crosslinkable elastomer which is employed for preparing the bitumen/polymer compositions and which is found again crosslinked in the said compositions may be such as polyisoprene, polynorbornene, polybutadiene, butyl rubber or ethylene/propylene/diene (EPDM) terpolymer. The said elastomer is advantageously chosen from the random or block copolymers of styrene and of a conjugated diene such as butadiene, isoprene, chloroprene, carboxylated butadiene or carboxylated isoprene and, more particularly, consists of one or more copolymers chosen from the block copolymers, with or without a tapered block structure of styrene and of butadiene, of styrene and of isoprene, of styrene and of chloroprene, of styrene and of carboxylated butadiene or else of styrene and of carboxylated isoprene. The copolymer of styrene and of conjugated diene, and in particular each of the abovementioned copolymers, advantageously has a styrene weight content ranging from 5% to 50%. The weight-average molecular mass of the copolymer of styrene and of conjugated diene, and especially that of the abovementioned copolymers, may be, for example, between 10 000 and 600 000 and is preferably between 30 000 and 400 000. The copolymer of styrene and of conjugated diene is preferably chosen from the di- or triblock copolymers of styrene and of butadiene, of styrene and of isoprene, of styrene and of carboxylated butadiene or else of styrene and of carboxylated isoprene which have styrene contents and weight-average molecular masses that are within the ranges defined above.

The sulphur-donating coupling agent which is employed in the preparation of the bitumen/polymer compositions according to the invention may consist of a product chosen from the group made up of elemental sulphur, hydrocarbyl polysulphides, sulphur-donating vulcanization accelerators, mixtures of such products with each other and/or with vulcanization accelerators which are not sulphur donors. In particular, the sulphur-donating coupling agent is chosen from the products M, which contain, by weight, from 0% to 100% of a component A consisting of one or more sulphur-donating vulcanization accelerators and from 100% to 0% of a component B consisting of one or more vulcanizing agents chosen from elemental sulphur and hydrocarbyl polysulphides, and the products N, which contain a component C consisting of one or more vulcanization accelerators which are not sulphur donors and a product M in a weight ratio of the component C to the product M ranging from 0.01 to 1 and preferably from 0.05 to 0.5.

The elemental sulphur capable of being employed to constitute, partly or completely, the coupling agent is advantageously flowers of sulphur and preferably sulphur crystallized in the orthorhombic form and known by the name of alpha sulphur.

The hydrocarbyl polysulphides capable of being employed for forming part or all of the coupling agent may be chosen from those defined in reference FR-A-2528439, which correspond to the general formula $R_1-(S)_m-(R_5-(S)_m)_x-R_2$, in which $R_1$ and $R_2$ each denote a $C_1-C_{20}$, saturated or unsaturated, monovalent hydrocarbon radical or are joined to each other to constitute a saturated or unsaturated, $C_1-C_{20}$ divalent hydrocarbon radical forming a ring with the other groups of atoms which are associated in the formula, $R_5$ is a $C_1-C_{20}$, saturated or unsaturated, divalent hydrocarbon radical, the symbols $-(S)_m-$ denote divalent groups, each made up of m sulphur atoms, it being possible for the values m to differ from one of the said groups to another and to denote integers ranging from 1 to 6 with at least one of the values of m equal to or greater than 2 and x denotes an integer taking the values from zero to 10. Preferred polysulphides correspond to the formula $R_3-(S)_p-R_3$, in which $R_3$ denotes a $C_6-C_{16}$ alkyl radical, for example hexyl, octyl, dodecyl, t-dodecyl, hexadecyl, nonyl, decyl, and $-(S)_p-$ denotes a divalent group formed by a chain sequence of p sulphur atoms, p being an integer ranging from 2 to 5.

When the coupling agent contains a sulphur-donating vulcanization accelerator, the latter may be chosen in particular from thiuram polysulphides of formula

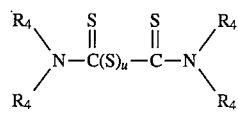

in which each of the symbols $R_4$, which are identical or different, denotes a $C_1-C_{12}$ and preferably $C_1-C_8$ hydrocarbon radical, especially an alkyl, cycloalkyl or aryl radical, or else two radicals $R_4$ which are attached to the same nitrogen atom are joined to each other to form a $C_2-C_8$ hydrocarbon divalent radical and u is a number ranging from 2 to 8. Examples of such vulcanization accelerators which may be mentioned are especially the compounds: dipentamethylenethiuram disulphide, dipentamethylenethiuram tetrasulphide, dipentamethylenethiuram hexasulphide, tetrabutylthiuram disulphide, tetramethylthiuram disulphide and tetraethylthiuram disulphide.

Other examples of sulphur-donating vulcanization accelerators which may also be mentioned are alkylphenol disulphides and disulphides such as morpholine disulphide and N,N'-caprolactam disulphide.

The vulcanization accelerators which are not sulphur donors and which can be employed for forming the component C of the coupling agents of the product N type may be sulphur compounds chosen especially from mercaptobenzothiazole and its derivatives, especially metallic benzothiazolethiolates and, above all, benzothiazolesulphenamides, dithiocarbamates of formula

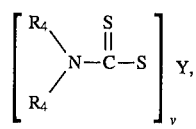

in which the symbols $R_4$, which are identical or different, have the meaning given above, Y denotes a metal and v denotes the valency of Y, and thiuram monosulphides of formula

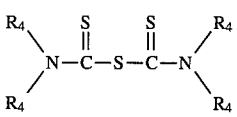

in which the symbols $R_4$ have the meaning given above.

Examples of vulcanization accelerators of the mercaptobenzothiazole type may be such as mercaptobenzothiazole, a benzothiazolethiolate of a metal such as zinc, sodium or copper, benzothiazolyl disulphide, 2-benzothiazolepentamethylenesulfenamide, 2-benzothiazolethiosulphenamide, 2-benzothiazole-dihydrocarbylsulphenamides in which the hydrocarbyl radical is an ethyl, isopropyl, tert-butyl or cyclohexyl radical, and N-oxydiethylene-2-benzothiazole-sulphenamide.

Among the vulcanization accelerators of the type of the dithiocarbamates of the abovementioned formula there may be mentioned the dimethyldithiocarbamate compounds of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

Examples of thiuram monosulphides which have the formula given above and which may be mentioned are the compounds such as dipentamethylenethiuram monosulphide, tetramethylthiuram monosulphide, tetraethylthiuram monosulphide and tetrabutylthiuram monosulphide.

Other vulcanization accelerators which are not sulphur donors and which do not belong to the classes defined above may also be employed. Such vulcanization accelerators may be such as 1,3-diphenylguanidine, di-ortho-tolylguanidine and zinc oxide, it being possible for this last compound to be employed optionally in the presence of fatty acids of the stearic acid, lauric acid or ethylcaproic acid type.

For more details on the vulcanization accelerators which are and are not sulphur donors and which can be employed in the constitution of the coupling agent, references EP-A-0360656 and EP-A-0409683 may be consulted, the content of which is incorporated into the present description by mention, as is the content of reference FR-A-2528439.

Depending on its composition, as indicated above, the coupling agent may be of the monocomponent type or of the multicomponent type, it being possible for the coupling agent of the multicomponent type to be formed prior to its use or else produced in situ in the medium in which it must be present. The coupling agent of the preformed multicomponent type or of the monocomponent type or the components of the coupling agent of the multicomponent type formed in situ may be used as they are, for example in the molten state, or else as a mixture, for example in solution or in suspension, with a diluent, for example a hydrocarbon compound.

The process for the preparation of the bitumen/polymer compositions according to the invention is advantageously carried out by first of all bringing the sulphur-crosslinkable elastomer into contact with the bitumen or mixture of bitumens, by employing a proportion of elastomer, relative to the bitumen or mixture of bitumens, which is chosen as defined above for this proportion, while operating at temperatures of between 100° C. and 230° C., more particularly between 120° C. and 190° C., and with agitation, for a sufficient period, generally of the order of a few tens of minutes to several hours and, for example, of the order of 1 hour to 8 hours, in order to form a homogeneous mixture, and then by incorporating the sulphur-donating coupling agent into the said mixture in an appropriate quantity chosen within the ranges defined above for the said quantity and by maintaining the whole agitated at temperatures of between 100° C. and 230° C., more particularly between 120° C. and 190° C., and identical or not identical with the temperatures of mixing of the elastomer with the bitumen or mixture of bitumens, for a period of at least 10 minutes and generally ranging from 10 minutes to 5 hours, more particularly from 30 minutes to 180 minutes, in order to form a reaction product constituting the crosslinked bitumen/polymer composition and, finally, into the said reaction product, maintained at a temperature of between 100° C. and 230° C., more particularly between 120° C. and 190° C., and with agitation, the inorganic adjuvant is incorporated in a desired quantity chosen within the ranges defined above for the said quantity, and the reaction mixture containing the inorganic adjuvant is maintained at the temperature of between 100° C. and 230° C., more particularly between 120° C. and 190° C., and with agitation for a period ranging from 20 minutes to 5 hours, more particularly from 30 minutes to 4 hours, in order to form the bitumen/polymer composition with a widened plasticity range.

The reaction mixture formed by the bitumen or mixture of bitumens, by the sulphur-crosslinkable elastomer and by the sulphur-donating coupling agent, which produces the crosslinked bitumen/polymer composition which is subsequently subjected to the action of the inorganic adjuvant, may have further added to it from 1% to 40% and more particularly from 2% to 30%, by weight of the bitumen, of a flux, which may consist, in particular, of a hydrocarbon oil which has a distillation range at atmospheric pressure, determined according to ASTM standard D 86-67, of between 100° C. and 600° C. and situated more especially between 150° C. and 400° C. This hydrocarbon oil, which may be especially a petroleum cut of aromatic nature, a petroleum cut of naphthenoaromatic nature, a petroleum cut of naphthenoparaffinic nature, a petroleum cut of paraffinic nature, a coal oil or else an oil of vegetable origin, is sufficiently "heavy" to limit the evaporation at the time of its addition to the bitumen and at the same time sufficiently "light" to be removed as much as possible after spreading of the bitumen/polymer composition containing it, so as to recover the same mechanical properties which the bitumen/polymer composition prepared without employing flux would have exhibited after hot spreading. The flux may be added to the reaction mixture which is formed from the bitumen, from the sulphur-crosslinkable elastomer and from the sulphur-donating coupling agent at any time of the constitution of the said reaction mixture, the quantity of flux being chosen, within the ranges defined above, in order to be compatible with the desired final utilization on the work site.

To the reaction mixture made up of the bitumen or mixture of bitumens, of the sulphur-crosslinkable elastomer, of the sulphur-donating coupling agent and optionally of the flux, which is used to produce the crosslinked bitumen/polymer composition which is subsequently treated with the inorganic adjuvant, it is further possible to add, at any time of the constitution of the said reaction mixture, various additives and especially nitrogen compounds of the amine or amide type, like those defined in reference EP-A-0409683, as promoters of adhesion of the final bitumen/polymer composition to the mineral surfaces, the said nitrogen compounds being incorporated into the said reaction mixture preferably before the addition of the sulphur-donating coupling agent to this reaction mixture, so that these nitrogen compounds are grafted onto the crosslinked elastomer present in the final bitumen/polymer composition.

The mixture consisting of the bitumen or mixture of bitumens, of the sulphur-crosslinkable elastomer, of the sulphur-donating coupling agent and optionally of the flux, from which the crosslinked bitumen/polymer composition subsequently subjected to the action of the inorganic adjuvant is formed, may also contain, by weight of the bitumen or mixture of bitumens, 0.1% to 5% and preferably 0.2% to 3% of an antigelling additive, added to the said mixture advantageously before the incorporation of the sulphur-donating coupling agent, which antigelling additive corresponds to the formula R-X, in which R is a $C_2$–$C_{50}$ and more particularly $C_2$–$C_{40}$ saturated or unsaturated, monovalent hydrocarbon radical, for example an alkyl, alkenyl, alkylaryl, alkadienyl or alkatrienyl radical or else a radical of the polycyclic type with condensed rings, and X denotes a functional group

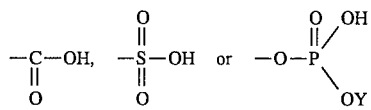

with Y denoting a hydrogen atom or said radical R. The antigelling additive may be chosen in particular from carboxylic acids containing a saturated or unsaturated fatty chain, especially pelargonic acid, lauric acid, stearic acid, palmitic acid, oleic acid, alkylarenesulphonic acids bearing one or two saturated or unsaturated fatty chains on the nucleus, especially nonylbenzenesulphonic acid, dodecylbenzenesulphonic acid, didodecylbenzeneeulphonic acid, polycyclic acids containing condensed rings, especially abietic acid and resinic acids derived therefrom, monohydrocarbyl esters and dihydrocarbyl esters of phosphoric acid, also called monohydrocarbylphosphoric and dicarbylphosphoric acids, especially monoalkylphosphoric acids and dialkylphosphoric acids, in which the alkyl radical is $C_2$–$C_{18}$, for example ethyl, 2-ethylhexyl, octyl, nonyl, decyl, dodecyl, hexadecyl, octadecyl, mixtures of carboxylic acids containing a fatty chain and mixtures of abietic or resinic acids and of carboxylic acids containing a fatty chain.

In an embodiment of the process according to the invention employing a hydrocarbon oil as defined above, as flux, the sulphur-crosslinkable elastomer and the sulphur-donating coupling agent are incorporated into the bitumen or mixture of bitumens in the form of a master. solution of these products in the hydrocarbon oil constituting the flux.

The master solution is prepared by bringing into contact the ingredients of which it is composed, namely hydrocarbon oil used as solvent, elastomer and coupling agent, with agitation, at temperatures of between 10° C. and 170° C. and more particularly between 40° C. and 120° C. for a sufficient time, for example from approximately 30 minutes to approximately 90 minutes, in order to obtain a complete dissolution of the elastomer and of the coupling agent in the hydrocarbon oil.

The respective concentrations of the elastomer and of the coupling agent in the master solution may vary quite widely, especially as a function of the nature of the hydrocarbon oil employed for dissolving the elastomer and the coupling agent. Thus, the respective quantities of elastomer and of coupling agent may advantageously represent 5% to 40% and 0.02% to 15% of the weight of the hydrocarbon oil. A preferred master solution contains, calculated by weight of the hydrocarbon oil employed as solvent, 10% to 35% of elastomer and 0.1% to 5% of coupling agent.

To prepare the bitumen/polymer compositions according to the invention by producing, using the master solution technique, the sulphur-crosslinked bitumen/polymer composition, which is subsequently subjected to the action of the inorganic adjuvant, the master solution of the elastomer and of the coupling agent is mixed with the bitumen or mixture of bitumens, while operating at a temperature of between 100° C. and 230° C. and with agitation, this being performed, for example, by adding the master solution to the bitumen or mixture of bitumens maintained agitated at the temperature between 100° C. and 230° C., and then the resulting mixture is maintained agitated at a temperature of between 100° C. and 230° C., for example at the temperature employed for mixing the master solution with the bitumen or mixture of bitumens, for a period of at least 10 minutes, and generally ranging from 10 minutes to 90 minutes, in order to form a reaction product constituting the crosslinked bitumen/polymer composition, and finally, into the said reaction product, maintained at a temperature of between 100° C. and 230° C., more particularly between 120° C. and 190° C., and agitated, the inorganic adjuvant is incorporated in a desired quantity chosen within the ranges defined above for the said quantity, and the reaction mixture containing the inorganic adjuvant is maintained at the temperature of between 100° C. and 230° C., more particularly between 120° C. and 190° C., and agitated, for a period ranging from 20 minutes to 5 hours, more particularly from 30 minutes to 4 hours, in order to form the bitumen/polymer composition with a widened plasticity range.

The quantity of master solution mixed with the bitumen or mixture of bitumens is chosen in order to provide the desired quantities of elastomer and of coupling agent, in relation to the bitumen or mixture of bitumens, the said quantities being within the ranges defined above.

A particularly preferred embodiment for the preparation, using the master solution technique, of the sulphur-crosslinked bitumen/polymer composition, which is subsequently subjected to the action of the inorganic adjuvant, consists in bringing, at a temperature of between 100° C. and 230° C. and with agitation, from 80% to 95% by weight of bitumen or mixture of bitumens into contact with 20% to 5% by weight of the master solution, the latter containing, by weight of the hydrocarbon oil used as solvent, 10% to 35% of elastomer and 0.1% to 5% of coupling agent, and in then maintaining the mixture thus obtained agitated at a temperature of between 100° C. and 230° C., and preferably at the temperature employed for bringing the bitumen or mixture of bitumens into contact with the master solution, for a period of at least 10 minutes and preferably ranging from 10 minutes to 60 minutes.

The bitumen/polymer compositions with a reinforced multigrade character, that is to say a widened plasticity range, which are obtained by the process according to the invention can be employed as they are or else diluted with variable proportions of a bitumen or mixture of bitumens or of a composition according to the invention in order to constitute bitumen/polymer binders which have a desired content of crosslinked elastomer, which may be either equal to (undiluted composition) or else lower than (diluted composition) the crosslinked elastomer content of the corresponding initial bitumen/ polymer compositions. The dilution of the bitumen/polymer compositions according to the invention with the bitumen or mixture of bitumens or with a composition according to the invention of different characteristics may be carried out either directly following the preparation of the said compositions, when a virtually immediate use of the resulting bitumen/polymer binders is required, or else after a more or less prolonged period of storage of the bitumen/polymer compositions, when a deferred use of the resulting bitumen/polymer binders is envisaged. The bitumen or mixture of bitumens employed for the dilution of a bitumen/polymer composition according to the invention may be chosen from the bitumens defined above as suitable for the preparation of the bitumen/polymer compositions. If appropriate, the bitumen or mixture of bitumens employed for the dilution may itself have been treated beforehand with an inorganic adjuvant according to the invention.

The dilution of a bitumen/polymer composition according to the invention with a bitumen or mixture of bitumens or with a second composition according to the invention with a lower content of crosslinked elastomer, in order to form a bitumen/polymer binder with a desired content of crosslinked elastomer which is lower than that of the bitumen/polymer composition to be diluted, is generally carried out by bringing into contact, with agitation at temperatures of between 100° C. and 230° C. and more particularly between 120° C. and 190° C., suitable proportions of the bitumen/polymer composition to be diluted and of bitumen or mixture of bitumens or of a second bitumen/polymer composition according to the invention. For example, the quantity of bitumen or mixture of bitumens or of a second bitumen/polymer composition employed for the dilution may be chosen in order that the bitumen/polymer binder resulting from the dilution should have a crosslinked elastomer content of between 0.5% and 5%, more particularly between 0.7% and 3%, by weight of the bitumen, and lower than the crosslinked elastomer content of the bitumen/polymer composition according to the invention which is subjected to the dilution.

The bitumen/polymer binders consisting of the bitumen/polymer compositions according to the invention or resulting from the dilution of the said compositions with a bitumen or mixture of bitumens or with another bitumen/polymer composition according to the invention, to the desired content of crosslinked elastomer in said binders, can be applied, directly or after conversion into aqueous emulsion, to the production of road surfacings, of the surface dressing type, to the production of bituminous mixes which are applied with heating or cold, or else to the production of leaktight facings.

The invention is illustrated by the following examples, given without any limitation being implied.

In these examples the quantities and percentages are expressed by weight unless indicated otherwise.

EXAMPLES 1 to 8

Control bitumen/polymer compositions (Examples 1 to 3 and 5 to 7) and bitumen/polymer compositions according to the invention (Examples 4 and 8) were prepared in order to evaluate and compare their physicomechanical characteristics.

The operation was carried out under the following conditions.

Example 1 (control)

Preparation of a sulphur-crosslinked bitumen/polymer composition not treated with the inorganic adjuvant.

Into a reactor maintained at 175° C. and agitated were introduced 964 parts of a bitumen which had a penetrability, determined according to the methods of NF Standard T 66004, of 80/100 and 35 parts of a block copolymer of styrene and of butadiene which had a weight-average molecular mass of 100 000 daltons and contained 25% of styrene. After 2.5 hours' mixing with agitation at 175° C. a homogeneous mass was obtained.

1 part of crystallized sulphur was then added to the abovementioned homogeneous mass, maintained at 175° C., and the whole was agitated further at the said temperature for 3 hours to form a crosslinked bitumen/polymer composition.

Example 2 (control)

Preparation of a sulphur-crosslinked bitumen/polymer composition from a bitumen pretreated with $H_3PO_4$.

The operation was carried out as described in Example 1, but by reacting the bitumen, at 175° C. and with agitation, with 5 parts of concentrated phosphoric acid for a period of 2 hours, before carrying out the mixing of bitumen and of block copolymer.

Example 3 (control)

Preparation of a sulphur-crosslinked bitumen/polymer composition from a mixture of bitumen and of block copolymer treated with $H_3PO_4$ before crosslinking with sulphur.

The operation was carried out as described in Example 1, but by reacting the mixture of bitumen and of block copolymer, at 175° C. and with agitation, with 5 parts of concentrated phosphoric acid for a period of 2 hours, before the introduction of the sulphur into the mixture of bitumen and block copolymer.

Example 4 (according to the invention)

Preparation of a sulphur-crosslinked bitumen/polymer composition subsequently treated with $H_3PO_4$.

A bitumen/polymer composition was prepared as described in Example 1 and then, once the reaction of crosslinking with sulphur was complete, 5 parts of concentrated phosphoric acid were added to the content of the reactor and the reaction mixture thus formed was maintained at 175° C. and agitated for a period of 2 hours.

Example 5 (control)

Preparation of a sulphur-crosslinked bitumen/polymer composition with a low polymer content and not treated with the inorganic adjuvant.

A bitumen/polymer composition containing 3.5% of block copolymer was prepared as described in Example 1 and then the composition obtained was diluted with a bitumen of 80/100 penetrability, the operation being carried out at 175° C. and with agitation, so as to make the copolymer content of the diluted composition equal to 1.5%.

Example 6 (control)

Preparation of a sulphur-crosslinked bitumen/polymer composition with a low polymer content from a bitumen pretreated with $H_3PO_4$.

960 parts of a bitumen of 80/100 penetrability and 9.66 parts of concentrated phosphoric acid were introduced into a reactor maintained at 175° C. and with agitation. After 3 hours' reaction at the said temperature 15 parts of a block copolymer of styrene and of butadiene which had the same characteristics as the block copolymer employed in Example 1 were then added to the content of the reactor. After 2.5 hours' mixing at 175° C. and with agitation, a homogeneous mass was obtained. 0.41 parts of crystallized sulphur were then added to this homogeneous mass and the whole was agitated at the said temperature for 1.5 hours to form the sulphur-crosslinked bitumen/polymer composition.

Example 7 (control)

Preparation of a sulphur-crosslinked bitumen/polymer composition with a low polymer content from a mixture of bitumen and of block copolymer treated with $H_3PO_4$ before crosslinking with sulphur.

The operation was carried out as in Example 6, but introducing the phosphoric acid after complete incorporation of the block copolymer into the bitumen and before introduction of the sulphur into the reaction mixture. The duration of reaction of $H_3PO_4$ with the mixture of bitumen and block copolymer was 3 hours.

Example 8 (according to the invention)

Preparation of a bitumen/polymer composition with a low polymer content, crosslinked with sulphur and subsequently treated with $H_3PO_4$.

A bitumen/polymer composition was prepared as described in Example 6, but with introduction of $H_3PO_4$ into the reaction mixture resulting from the crosslinking of the mixture of bitumen and of block copolymer with sulphur. The duration of the reaction of $H_3PO_4$ with the said reaction mixture, carried out at 175° C. and with agitation, was 3 hours.

The following characteristics were determined, in addition to the appearance of the compositions, for each of the bitumen/polymer compositions obtained as indicated in Examples 1 to 8:

penetrability at 25° C. (Pen. 25)
ring-and-ball softening point (RBT)
Fraass point (Fraass)
plasticity range (Plast. R.)
tensile rheological characteristics according to NF standard T 46 002, namely:
breaking stress ($\sigma b$)
elongation at break ($\epsilon b$)

The results obtained, as a function of the order of addition of the reactants, are given in Table I.

Example 10 (control)

Sulphur-crosslinked bitumen/polymer composition from a mixture of bitumen and of block copolymer treated with $H_2SO_4$ before crosslinking with sulphur.

Example 11 (according to the invention)

Sulphur-crosslinked bitumen/polymer composition subsequently treated with $H_2SO_4$.

Example 12 (control)

Sulphur-crosslinked bitumen/polymer composition with a low polymer content from a bitumen pretreated with $H_2SO_4$.

Example 13 (control)

Sulphur-crosslinked bitumen/polymer composition with a low polymer content from a mixture of bitumen and of block copolymer treated with $H_2SO_4$ before crosslinking with sulphur.

TABLE I

| Examples | Order of introduction | Appearance | Pen. 25 (0.1 mm) | RBT (°C.) | Fraass (°C.) | Plast. R. | Tensile at 20° C. speed = 500 mm/min | | Tensile at 5° C. speed = 500 mm/min | |
|---|---|---|---|---|---|---|---|---|---|---|
| | | | | | | | $\sigma b$ | $\epsilon b$ (%) | $\sigma b$ | $\epsilon b$ (%) |
| 1 | B + P + C | Homogeneous | 68 | 55.9 | −25 | 80.9 | 0.98 | >900 | 6.7 | >900 |
| 2 | B + A + P + C | UDP/DEP | n.c. | n.c. | n.c. | n.c. | n.c. | n.c. | n.c. | n.c. |
| 3 | B + P + A + C | DEP | 47 | 63.2 | −23 | 86.2 | 0.57 | >900 | 3.4 | 720 |
| 4 | B + P + C + A | Homogeneous | 53 | 64.8 | −29 | 93.8 | 1.36 | >900 | 7.9 | >900 |
| 5 | B + P + C | Homogeneous | 76 | 50.5 | −19 | 69.5 | 0.24 | >900 | 3 | >900 |
| 6 | B + A + P + C | UDP/DEP | 48 | 59.5 | −19 | 78.5 | 0.20 | >900 | 1.9 | >900 |
| 7 | B + P + A + C | DEP | 53 | 55 | −16 | 71 | 0.23 | >900 | 2 | >900 |
| 8 | B + P + C + A | Homogeneous | 60 | 56.4 | −21 | 77.4 | 0.48 | >900 | 4 | >900 |

Order of introduction: Order of introduction of the constituents of the bitumen/polymer composition
B = Bitumen; P = Block copolymer; C = Crosslinking agent (sulphur); A = $H_3PO_4$ (inorganic adjuvant)
Appearance: UDP = Presence of undissolved polymer; DEP = Deposits of asphaltenic type on the walls of the reactor
$\sigma b$ expressed in daN/cm$^2$
n.c. = not characterizable (product too heterogeneous)

EXAMPLES 9 to 14

By repeating the procedures of Examples 2 to 4 and 6 to 8, but with replacement of the inorganic adjuvant $H_3PO_4$ by the inorganic adjuvant $H_2SO_4$, employed in the same quantity, control bitumen/polymer compositions (Examples 9 to 10 and 12 to 13) and bitumen/polymer compositions according to the invention (Examples 11 and 14) were formed as follows:

Example 9 (control)

Sulphur-crosslinked bitumen/polymer composition from a bitumen pretreated with $H_2SO_4$.

Example 14 (according to the invention)

Bitumen/polymer composition with a low polymer content, crosslinked with sulphur and subsequently treated with $H_2SO_4$.

Characteristics similar to those determined on the bitumen/polymer compositions of Examples 1 to 8, and the appearance of the compositions, were determined for each of the bitumen/polymer compositions obtained according to Examples 9 to 14.

The results obtained, as a function of the order of addition of the reactants, are given in Table II.

TABLE II

| Examples | Order of introduction | Appearance | Pen. 25 (0.1 mm) | RBT (°C.) | Fraass (°C.) | Plast R. | Tensile at 20° C. speed = 500 mm/min σb | Tensile at 20° C. speed = 500 mm/min εb (%) | Tensile at 5° C. speed = 500 mm/min σb | Tensile at 5° C. speed = 500 mm/min εb (%) |
|---|---|---|---|---|---|---|---|---|---|---|
| 1  | B + P + C     | Homogeneous | 68  | 55.9 | −25  | 130.9 | 0.98 | >900 | 6.7  | >900 |
| 9  | B + A + P + C | UDP/DEP     | n.c. | n.c. | n.c. | n.c.  | n.c. | n.c. | n.c. | n.c. |
| 10 | B + P + A + C | DEP         | 46  | 65   | −21  | 86    | 0.61 | >900 | 3.8  | 600  |
| 11 | B + P + C + A | Homogeneous | 51  | 67   | −27  | 94    | 1.5  | >900 | 8    | >900 |
| 5  | B + P + C     | Homogeneous | 76  | 50.5 | −19  | 69.5  | 0.24 | >900 | 3    | >900 |
| 12 | B + A + P + C | UDP/DEP     | 46  | 58   | −16  | 74    | 0.25 | >900 | 2.1  | >900 |
| 13 | B + P + A + C | DEP         | 51  | 54   | −15  | 69    | 0.27 | >900 | 2.2  | >900 |
| 14 | B + P + C + A | Homogeneous | 59  | 59   | −19  | 78    | 0.55 | >900 | 4.5  | >900 |

Order of introduction: Order of introduction of the constituents of the bitumen/polymer composition
B = Bitumen; P = Block copolymer; C = Crosslinking agent (sulphur); A = H$_3$SO$_4$ (inorganic adjuvant)
Appearance: UDP = Presence of undissolved polymer; DEP = Deposits of asphaltenic type on the walls of the reactor
σb expressed in daN/cm$^2$
n.c. = not characterizable (product too heterogeneous)

In the light of the characteristics listed together in Tables I and II it appears that:

the treatment of the bitumen with the inorganic adjuvant, namely H$_3$PO$_4$ (Table I) or H$_2$SO$_4$ (Table II), before the introduction of the polymer into the bitumen, makes dissolving of the polymer more difficult (cf. Examples 2, 6, 9 and 12);

the introduction of the inorganic adjuvant after swelling of the polymer in the bitumen perturbs the crosslinking carried out subsequently, poorly elastic products being obtained, and with formation of insoluble asphaltenes (cf. Examples 3, 7, 10 and 13);

the introduction of the inorganic adjuvant once the crosslinking of the bitumen/polymer mixture has been completed, as proposed by the invention (cf. Examples 4, 8, 11 and 14), results in the formation of homogeneous products whose characteristics, in particular the plasticity range and elastic properties, are markedly improved in relation to the characteristics of the sulphur-crosslinked bitumen/polymer compositions which have not, however, been treated with the inorganic adjuvant (cf. Examples 1 and 5).

We claim:

1. Process for the preparation of bitumen/polymer compositions with a reinforced multigrade character, in which, while operating at temperatures of between 100° C. and 230° C. and with agitation for a period of at least 10 minutes, a bitumen or mixture of bitumens is brought into contact with, calculated by weight of bitumen or mixture of bitumens, 0.5% to 20% of a sulphur-crosslinkable elastomer and a sulphur-donating coupling agent in a quantity such as to provide a quantity of free sulphur representing 0.1% to 20% of the weight of the sulphur-crosslinkable elastomer in the reaction mixture formed from the bitumen or mixture of bitumens, elastomer and coupling agent ingredients, in order to produce a sulphur-crosslinked composition, wherein in the said process the reaction mixture resulting from the sulphur vulcanization, is maintained at a temperature of between 100° C. and 230° C. and with agitation, there is incorporated 0.005% to 5%, by weight of the bitumen or mixture of bitumens, of an inorganic adjuvant consisting of at least one compound selected from the group consisting of phosphoric acids, boric acids, sulphuric acid, the anhydrides of the said acids and chlorosulphuric acid, and the reaction mixture containing the inorganic adjuvant is maintained at the temperature of between 100° C. and 230° C. and with agitation for a period of at least 20 minutes.

2. Process according to claim 1, wherein the quantity of inorganic adjuvant which is incorporated into the reaction mixture resulting from the crosslinking with sulphur represents 0.01% to 2% by weight of the bitumen or mixture of bitumens.

3. Process according to claim 1 or 2, wherein the inorganic adjuvant consists of at least one compound selected from the group consisting of H$_3$PO$_4$, P$_2$O$_5$, H$_3$BO$_3$, B$_2$O$_3$, H$_2$SO$_4$, SO$_3$ and HSO$_3$Cl.

4. Process according to one of claim 1 wherein the bitumen or mixture of bitumens has a kinematic viscosity at 100° C. of between 0.5×10$^{-4}$ m$^2$/s and 3×10$^{-2}$ m$^2$/s.

5. Process according to claim 4, wherein the bitumen or mixture of bitumens has a penetrability, defined in accordance with the NF Standard T 66 004, of between 5 and 500.

6. Process according to claim 1 wherein the sulphur-crosslinkable elastomer is selected from the group consisting of the random or block copolymers of styrene and of a conjugated diene.

7. Process according to claim 6, wherein the copolymer of styrene and of conjugated diene contains, by weight, 5 to 50% of styrene.

8. Process according to claim 6 wherein the weight-average molecular mass of the copolymer of styrene and of conjugated diene is between 10 000 and 600 000.

9. Process according to claim 1 wherein the sulphur-donating coupling agent is selected from the group consisting of elemental sulphur, hydrocarbyl polysulphides, sulphur-donating vulcanization accelerators, mixtures of such products with each other and mixtures of such products with vulcanization accelerators which are not sulphur donors.

10. Process according to claim 9, wherein the sulphur-donating coupling agent is chosen from the products M, which contain, by weight, from 0% to 100% of a component A consisting of one or more sulphur-donating vulcanization accelerators and from 100% to 0% of a component B consisting of at least one vulcanizing agent selected from the group consisting of elemental sulphur and hydrocarbyl polysulphides, and the products N, which contain a component C consisting of one or more vulcanization accelerators which are not sulphur donors and a product M in a weight ratio of the component C to the product M ranging from 0.01 to 1.

11. A process according to claim 1 which comprises bringing the sulphur-crosslinkable elastomer in contact with the bitumen or mixture of bitumens, while operating at temperatures of between 100° C. and 230° C., and with agitation, for a sufficient period, in order to form a homogeneous mixture, then incorporation the sulphur-donating coupling agent into the said mixture and maintaining the whole agitated at temperatures of between 100° C. and 230° C., for a period of at least 10 minutes, in order to form a reaction product constituting a crosslinked bitumen/polymer composition, and finally incorporating the desired quantity of inorganic adjuvant into the said reaction product, maintained at a temperature of between 100° C. and 230° C. with agitation and maintaining the reaction mixture containing the inorganic adjuvant at the temperature of between 100° C. and 230° C., and with agitation for a period ranging from 20 minutes to 5 hours, in order to form the bitumen/polymer composition with a widened plasticity range.

12. Process according to claim 1, wherein the reaction mixture formed by the bitumen or mixture of bitumens, by the sulphur-crosslinkable elastomer and by the sulphur-donating coupling agent, which produces the crosslinked bitumen/polymer composition which is subsequently subjected to the action of the inorganic adjuvant, has added to it, at any time of its constitution, from 1% to 40% and, by weight of the bitumen or mixture of bitumens, of a flux.

13. Process according to claim 12, wherein the said flux consists of a hydrocarbon oil which has a distillation range at atmospheric pressure, determined according to ASTM standard D 86-67, of between 100° C. and 600° C.

14. Process according to claim 13, wherein the hydrocarbon oil is selected from the group consisting of petroleum cuts of aromatic nature, petroleum cuts of naphthenoaromatic nature, petroleum cuts of naphthenoparaffinic nature, petroleum cuts of paraffinic nature, coal oils and oils of vegetable origin.

15. Process according to claim 13, wherein the sulphur-crosslinkable elastomer and the coupling agent are incorporated into the bitumen in the form of a master solution of these products in the hydrocarbon oil.

16. Process according to claim 15, wherein the master solution is prepared by bringing into contact the ingredients of which it is composed, with agitation, at temperatures of between 10° C. and 170° C.

17. Process according to claim 15 wherein the master solution contains, calculated by weight of the hydrocarbon oil, 5% to 40% of sulphur-crosslinkable elastomer and 0.02% to 15% of sulphur-donating coupling agent.

18. Process according to claim 15 wherein from 80% to 95% by weight of bitumen or mixture of bitumens is brought, between 100° C. and 230° C. and with agitation, into contact with 20% to 5% by weight of the master solution, the latter containing, by weight of the hydrocarbon oil used as solvent, 10% to 35% of sulphur-crosslinkable elastomer and 0.1% to 5% of coupling agent, and then the mixture thus obtained is maintained agitated between 100° C. and 200° C. for a period of at least 10 minutes in order to form the crosslinked bitumen/polymer composition which is subsequently subjected to the action of the inorganic adjuvant.

19. A process for the production of bitumen/polymer binders which are usable directly or after conversion into aqueous emulsions, for the production of coatings, which comprises diluting the composition of claim 1 with at least one bitumen and a lower content of a crosslinked elastomer.

20. A process according to claim 1 wherein the sulphur-crosslinkable elastomer and the sulphur-donating coupling agent are employed in an amount of from 0.7% to 15%.

21. A process according to claim 4 wherein the kinematic viscosity at 100° C. is between $1 \times 10^{-4} m^2/s$ and $2 \times 10^{-2} m^2/s$.

22. A process according to claim 5 wherein the penetrability is between 10 and 400.

23. A process according to claim 8 wherein the weight average molecular mass is between 30 000 and 400 000.

24. A process according to claim 10 wherein the weight ratio of component C is from 0.05 to 0.5.

25. A process according to claim 11, wherein the homogeneous mixture is formed by agitation for 1 hour to 8 hours.

26. A process according to claim 11 wherein after incorporating the sulphur-donating coupling agent, the mixture is agitated at a temperature between 120° C. and 190° C. for a period of from 10 minutes to 5 hours.

27. A process according to claim 11 wherein after incorporating the adjuvant the reaction product is maintained at a temperature between 120° C. and 190° C. with agitation for a period ranging from 30 minutes to 4 hours.

28. A process according to claim 12 wherein the flux is added in an amount of from 2% to 30%.

29. A process according to claim 13 wherein the hydrocarbon oil has a distillation range of between 150° C. and 400° C.

* * * * *

UNITED STATES PATENT AND TRADEMARK OFFICE
CERTIFICATE OF CORRECTION

PATENT NO. : 5,618,862
DATED : April 8, 1997
INVENTOR(S) : Laurent GERMANAUD, Jean Pascal PLANCHE and Patrick TURELLO It is certified that error appears in the above-indentified patent and that said Letters Patent is hereby corrected as shown below:

At column 7, line 15; delete "didodecylbenzeneeulphonic" and enter therefor --didodecylbenzenesulphonic--.

At columns 13 and 14, Table II in the column Plast R. in Example 1, delete "130.9" and enter therefor --80.9--.

At column 14, at line 30; delete "one of".

At column 16, at line 17; delete "and" and enter therefor --to--.

At column 16, at line 19; delete "and the sulphur-donating cou coupling"; and at line 20; delete "agent are" and enter therefor --is--.

Signed and Sealed this

Twenty-eighth Day of October, 1997

Attest:

Attesting Officer

BRUCE LEHMAN

Commissioner of Patents and Trademarks